(12) United States Patent
Pearson

(10) Patent No.: US 9,750,180 B2
(45) Date of Patent: Sep. 5, 2017

(54) POWERED LANDSCAPING SYSTEM

(71) Applicant: Crary Industries, Inc., West Fargo, ND (US)

(72) Inventor: Christopher A. Pearson, Argusville, ND (US)

(73) Assignee: Crary Industries, Inc., West Fargo, ND (US)

( * ) Notice: Subject to any disclaimer, the term of this patent is extended or adjusted under 35 U.S.C. 154(b) by 94 days.

(21) Appl. No.: 14/521,919

(22) Filed: Oct. 23, 2014

(65) Prior Publication Data

US 2016/0113196 A1    Apr. 28, 2016

(51) Int. Cl.
*A01D 34/416* (2006.01)
*A01G 1/12* (2006.01)
*A01D 42/06* (2006.01)

(52) U.S. Cl.
CPC ......... *A01D 34/4165* (2013.01); *A01D 42/06* (2013.01); *A01G 1/125* (2013.01)

(58) Field of Classification Search
CPC ............ A01D 34/4165; A01D 2101/00; A01D 34/824; A01D 34/68; A01D 34/71; A01D 42/06; A01G 1/125
See application file for complete search history.

(56) References Cited

U.S. PATENT DOCUMENTS

| | | | | |
|---|---|---|---|---|
| 3,441,201 A | * | 4/1969 | Hollenberg | F04D 17/04 112/280 |
| 4,187,577 A | * | 2/1980 | Hansen | A01D 42/06 15/328 |
| 4,227,280 A | * | 10/1980 | Comer | A01D 42/06 15/330 |
| 4,237,576 A | * | 12/1980 | Stakes | A01G 1/125 15/344 |
| 4,242,794 A | * | 1/1981 | Peterson | E01H 1/0809 15/328 |
| 4,404,706 A | * | 9/1983 | Loyd | A47L 5/14 15/344 |
| 4,703,613 A | * | 11/1987 | Raymond | A01D 34/08 56/12.7 |

(Continued)

OTHER PUBLICATIONS http://www.echo-usa.com/Products/Pro-Attachment-Series, at least as early as Oct. 20, 2014.

*Primary Examiner* — Alicia Torres
*Assistant Examiner* — Adam Behrens
(74) *Attorney, Agent, or Firm* — Wood, Phillips, Katz, Clark & Mortimer

(57) ABSTRACT

A powered landscaping apparatus having a frame, at least one wheel on the frame through which the frame can be supported upon and advanced over a subjacent support surface, a blower assembly operatively positioned on the frame and having a fan assembly that is mounted to be turned guidingly around a vertically extending axis, and a drive on the frame for moving the fan assembly around the vertically extending axis. The blower assembly is configured to generate a pressurized supply of air that is propelled in a stream that is directed in a manner to continuously redistribute loose material that resides on the subjacent support surface as the fan assembly is moved around the vertically extending axis by the drive and the frame is advanced over the subjacent support surface.

21 Claims, 6 Drawing Sheets

(56) References Cited

U.S. PATENT DOCUMENTS

| | | | | |
|---|---|---|---|---|
| 4,827,702 A * | 5/1989 | Cerreta | A01D 34/416 | 30/276 |
| 4,835,950 A * | 6/1989 | Cerreta | A01D 34/416 | 56/12.8 |
| 4,936,886 A * | 6/1990 | Quillen | A01D 34/84 | 172/14 |
| 5,577,374 A * | 11/1996 | Huston | A01D 34/84 | 56/12.1 |
| 5,626,006 A * | 5/1997 | Fricke, Sr. | A01D 34/001 | 30/276 |
| 5,768,749 A * | 6/1998 | Ohi | A47L 9/02 | 15/328 |
| 5,826,414 A * | 10/1998 | Lenczuk | A01D 34/001 | 56/14.7 |
| 5,862,655 A * | 1/1999 | Altamirano | A01D 34/001 | 56/12.1 |
| 5,894,630 A * | 4/1999 | Bitner | A47L 5/14 | 15/330 |
| 5,906,051 A * | 5/1999 | Nannen | A01D 34/4163 | 30/276 |
| 6,073,305 A * | 6/2000 | Hesskamp | A47L 5/14 | 15/405 |
| 6,226,833 B1 * | 5/2001 | Kawaguchi | A01G 1/125 | 15/330 |
| 6,256,970 B1 * | 7/2001 | Fleener | A01D 34/84 | 56/12.1 |
| 6,415,585 B2 | 7/2002 | Morabit et al. | | |
| 6,922,981 B1 * | 8/2005 | Tyree | A01B 33/06 | 56/12.7 |
| 7,382,104 B2 * | 6/2008 | Jacobson | A01D 34/902 | 15/330 |
| 7,841,044 B1 | 11/2010 | Weihl et al. | | |
| 7,997,593 B2 * | 8/2011 | Sergyeyenko | B62B 1/12 | 15/340.2 |
| 8,186,135 B2 * | 5/2012 | Leonardi | A01D 34/416 | 56/12.7 |
| 2002/0032966 A1 * | 3/2002 | Kreissle | A01D 34/6806 | 30/272.1 |
| 2002/0189221 A1 * | 12/2002 | Morabit | A01D 34/416 | 56/12.7 |
| 2003/0079455 A1 * | 5/2003 | Suchdev | A01B 1/065 | 56/16.9 |
| 2003/0082016 A1 * | 5/2003 | Eavenson, Sr. | A01G 1/125 | 406/38 |
| 2006/0010850 A1 * | 1/2006 | Jacobson | A01D 34/902 | 60/39.01 |
| 2008/0301902 A1 * | 12/2008 | Gloger | A01G 1/125 | 15/405 |

* cited by examiner

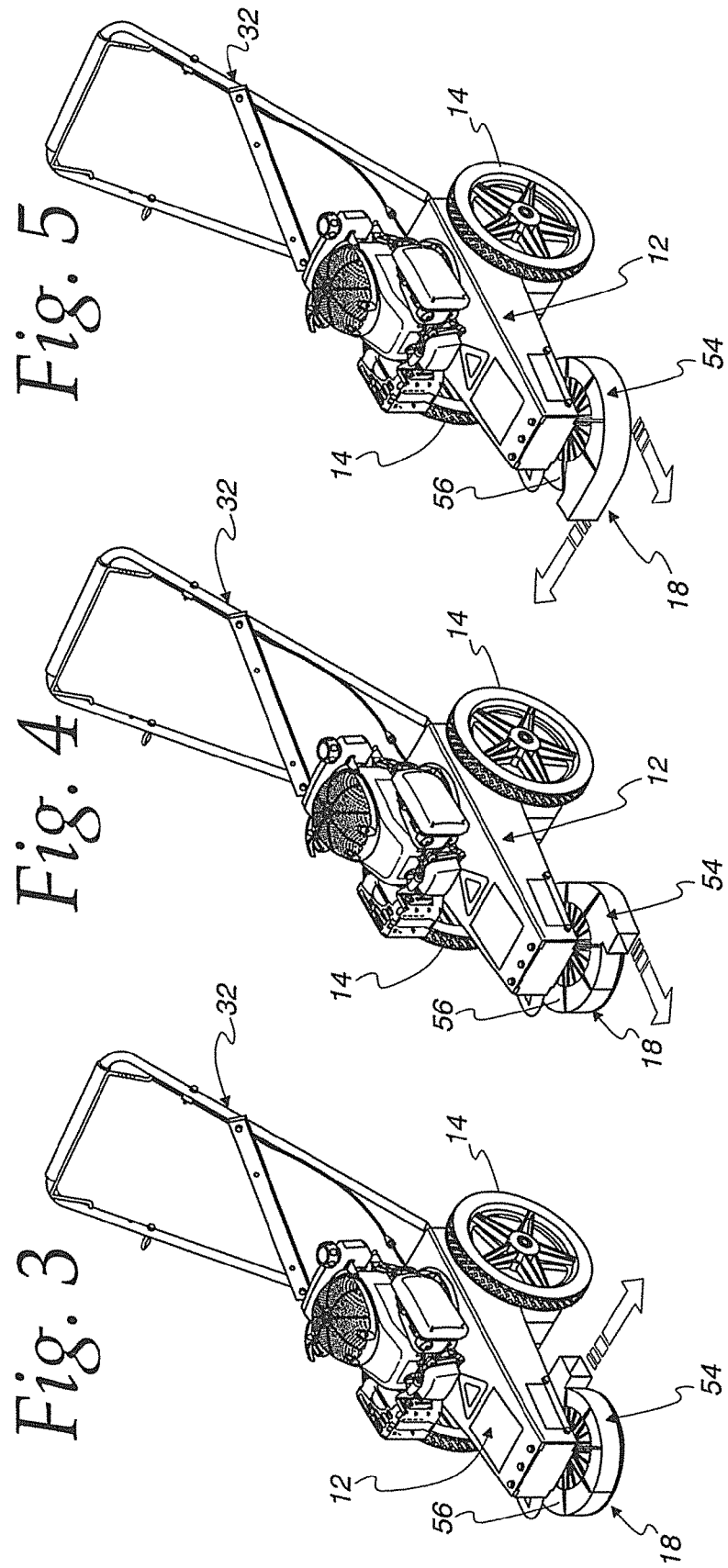

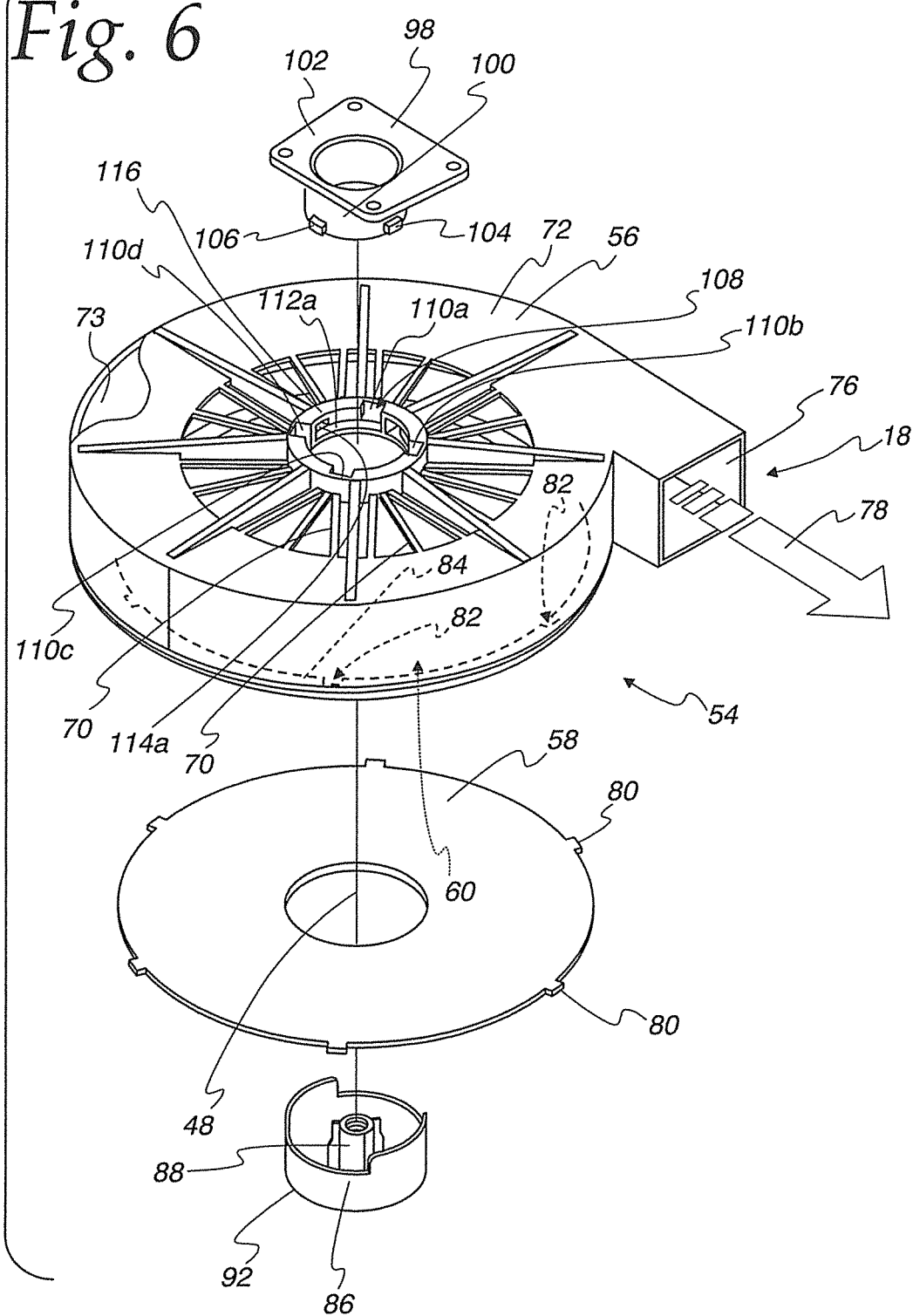

POWERED LANDSCAPING SYSTEM

BACKGROUND OF THE INVENTION

Field of the Invention

This invention relates to landscaping equipment and, more particularly, to powered landscaping equipment that is movable against and relative to subjacent terrain on a wheeled frame.

Background Art

Currently, a number of different types of powered landscaping equipment are constructed using a wheeled frame. Through a graspable handle, an operator can maneuver the equipment relative to subjacent terrain. Within this category of equipment are: a) those apparatus utilizing a rotary line that severs vegetation; and b) those apparatus that generate a controlled pressurized stream of air that can be directed to relocate loose vegetation and other debris situated on the subjacent terrain. Typically, these two types of equipment, characterized respectively as line trimmers and blowers, are made with a dedicated design and with the anticipation that they will be used on a regular basis in extreme environments. Thus, rugged frame structure and high capacity power sources are commonly utilized, as a result of which each piece of equipment is relatively large and has a substantial weight.

For landscaping operations, and even for individual homeowners, that might use both types of equipment, the above dedicated designs have some inherent drawbacks. First of all, the initial purchase of two separate pieces of equipment may involve a substantial expense.

Further, landscape crews typically transport this type of equipment from job to job. Thus, storage space must be separately maintained for each of the pieces of equipment on the trailers or vehicles that are used to transport crews from one site to the next. Space must also be allocated for this equipment at a base location where potentially several crews stage their equipment.

The requirement for these two dedicated types of equipment also multiplies the maintenance steps that must be taken regularly for the equipment.

Another drawback with the blower constructions described above is that they are often designed with fixed configurations that limit their utility. For example, one common blower design utilizes a fan arrangement that rotates around a horizontal axis. A discharge conduit that directs the exiting pressurized air may have a fixed orientation relative to the frame, whereby an operator may have to inconveniently maneuver the equipment to access all required areas and redistribute loose material on the subjacent terrain in a controlled manner. For example, if the discharge conduit is arranged to direct outflow of air so that it is propelled in a single lateral direction, an operator may have to maintain the same orientation of the blower as repeated parallel paths are traveled to progressively accumulate loose material. Further, in narrow areas, it may not be desirable to cause the pressurized air to be propelled laterally, which may cause loose material to be directed into beds and other locations that are to be kept free of such material.

Further, the horizontal orientation of the fan on the blower may create a larger than desired vertical profile to accommodate the fan diameter. Larger designs create problems from the standpoint of storage, transportation, and access at certain sites at which the equipment is utilized.

Another potential problem with existing designs is that they are often difficult to maintain. Dedicated blowers often incorporate complex housings for fan assemblies which may make access thereto difficult as when maintenance or repair is required.

Such complicated designs may also complicate manufacture, which translates into higher equipment cost.

In spite of a long evolution of this type of equipment, the industry continues to seek improved designs that afford, particularly professional users, rugged equipment that is reasonably priced, long-lasting, easy to maintain, convenient to use, and practical to store and transport.

SUMMARY OF THE INVENTION

In one form, the invention is directed to a powered landscaping apparatus including: a frame; at least one wheel on the frame through which the frame can be supported upon and advanced over a subjacent support surface; a blower assembly operatively positioned on the frame and having a fan assembly that is mounted to be turned guidingly around a vertically extending axis; and a drive on the frame for moving the fan assembly around the vertically extending axis. The blower assembly is configured to generate a pressurized supply of air that is propelled in a stream that is directed in a manner to continuously redistribute loose material that resides on the subjacent support surface as the fan assembly is moved around the vertically extending axis by the drive and the frame is advanced over the subjacent support surface.

In one form, the powered landscaping apparatus has a front and rear and laterally spaced sides. The frame has a main section on which the drive is mounted. The at least one wheel includes first and second spaced wheels. The frame further includes an arm projecting forwardly from the main section and supporting a first shaft that is connected to the fan assembly and is turned around the vertically extending axis by the drive.

In one form, the drive has an associated main shaft that is spaced from, and drives, the first shaft around the vertically extending axis as the drive is operated.

In one form, the powered landscaping apparatus has a front and rear and laterally spaced sides. The frame further includes a handle assembly with at least one gripping region that is configured to be engaged by a user situated behind the powered landscaping apparatus and at which forces can be applied by a user to move the powered landscaping apparatus relative to the subjacent support surface.

In one form, the powered landscaping apparatus further includes a vegetation trimming assembly configured to be operatively positioned on the frame in place of the blower assembly. The vegetation trimming assembly has at least one cutting element that is turned around the vertically extending axis as the drive is operated with the vegetation trimming assembly operatively positioned.

In one form, the at least one cutting element has an elongate body projecting radially away from the vertically extending axis.

In one form, the elongate body is a flexible line.

In one form, the at least one cutting element has a plurality of elongate bodies each projecting radially away from the vertically extending axis.

In one form, the vegetation trimming apparatus has a main body that carries the at least one cutting element. The powered landscaping apparatus further includes a mounting unit that is configured to releasably secure the main body to the first shaft so that the main body follows movement of the first shaft around the vertically extending axis with the vegetation trimming apparatus operatively positioned.

In one form, the mounting unit is configured to releasably secure the fan assembly to the first shaft so that the fan assembly follows movement of the first shaft around the vertically extending axis with the blower assembly operatively positioned.

In one form, the mounting unit has a downwardly facing surface that is configured to bear against the subjacent support surface to confine downward movement of the at least one cutting element with the vegetation trimming apparatus operatively positioned.

In one form, the downwardly facing surface is convexly shaped.

In one form, the blower assembly has a housing attached to the frame that defines a chamber within which the fan assembly moves.

In one form, the housing defines a discharge conduit through which pressurized air generated by the fan assembly is directed in a stream in a discharge direction.

In one form, the housing is configured so that the discharge direction relative to the frame can be selectively changed.

In one form, the housing has two separate parts between which the fan assembly is captively located.

In one form, the housing and frame have cooperating connectors configured to allow the housing to be selectively placed in first and second different predetermined positions wherein the discharge conduit is oriented to direct the stream of pressurized air in first and second different directions.

In one form, the housing and frame have cooperating connectors configured to allow the housing to be selectively moved from a separated state into an assembled state by relatively moving the housing and frame in a predetermined manner as an incident of which the housing is maintained in the assembled state without requiring separate fasteners.

In one form, the fan assembly has a plurality of air pushing vanes that project in lines that do not intersect at the vertically extending axis.

In one form, the blower assembly has a housing that is attached to the frame and defines a chamber within which the fan assembly moves. The downwardly facing surface of the mounting unit resides below the housing with the blower assembly operatively positioned.

BRIEF DESCRIPTION OF THE DRAWINGS

FIG. 3 is a reduced, perspective view as in FIG. 2, with the blower assembly operatively positioned and with a housing thereon in one orientation to discharge pressurized air in one lateral direction;

FIG. 4 is a view as in FIG. 3 wherein the housing orientation has been changed to cause pressurized air to be discharged in a forward direction;

FIG. 5 is a view as in FIGS. 3 and 4 wherein the housing has been placed into a further different orientation to cause pressurized air to be discharged laterally oppositely to the discharge direction in FIG. 3;

FIG. 6 is an enlarged, exploded, perspective view of the blower assembly in FIGS. 2-5;

DETAILED DESCRIPTION OF THE PREFERRED EMBODIMENT

Figure 1:
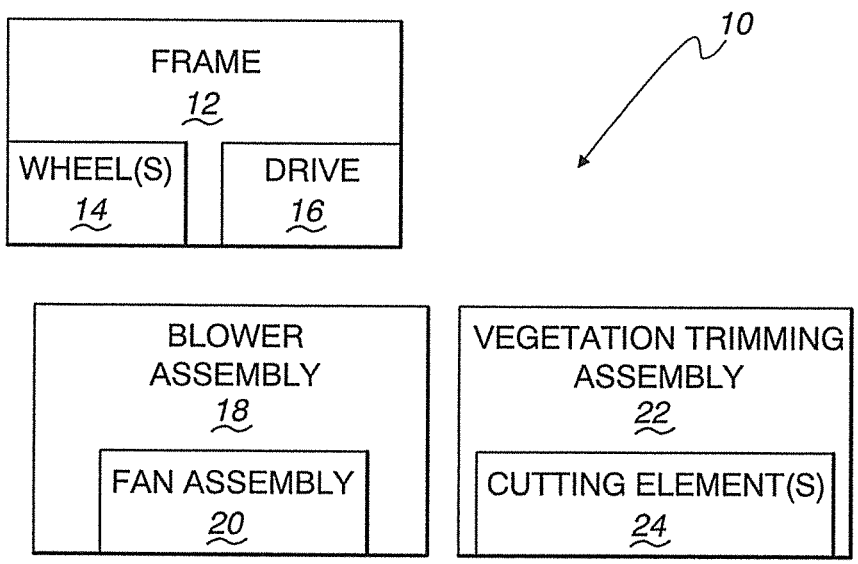
FIG. 1 is a schematic representation of a powered landscaping apparatus/system, according to the invention, and including a wheeled frame to which blower and vegetation trimming assemblies can be interchangeably operatively positioned, one in place of the other.

In FIG. 1, a powered landscaping apparatus, according to the present invention, is shown in schematic form at 10. The apparatus 10 is essentially a system that can be selectively reconfigured by a user to have distinct operating capabilities.

More specifically, the apparatus 10 has a frame 12 with at least one wheel 14 thereon through which the frame 12 can be supported upon, and advanced over, a subjacent support surface. The frame 12 also supports a drive 16 that may have any conventional construction, such as one operated by combustible fuel, one that is electrically powered, etc.

A blower assembly 18 is configured to be changed between states wherein it is: a) fully separated from the frame 12; and b) operatively positioned on the frame. The operatively positioned blower assembly 18 has a fan assembly 20 that is mounted to be turned guidingly around a vertically extending axis by the drive 16.

The blower assembly 18 is configured to generate a pressurized supply of air that is propelled in a stream that is directed in a manner to continuously redistribute loose material that resides on a subjacent support surface as the fan assembly 20 is moved around the vertically extending axis by the drive 16 and the frame 12 is advanced over the subjacent support surface.

One aspect of the invention involves this combination of components alone. Another aspect of the invention is the aforementioned system 10 which additionally includes a vegetation trimming assembly 22 with at least one cutting element 24. The vegetation trimming assembly 22 is configured to be operatively positioned on the frame 12 in place of the blower assembly 18. With the vegetation trimming assembly 22 operatively positioned, the drive 16 causes the at least one cutting element 24 to be turned around the aforementioned vertically extending axis.

The schematic showing of the components in FIG. 1 is intended to encompass the specific embodiments hereinbelow described, as well as variations of the components therein and their interaction that would be apparent to one skilled in the art with the inventive teachings in hand. The schematic showing is intended to encompass all those component variations and their interactions, with the specific embodiments hereinbelow being only exemplary in nature.

One specific form of the apparatus/system 10 shown schematically in FIG. 1 is shown in FIGS. 2-10. In this embodiment, the frame 12 is supported upon two laterally spaced wheels 14 that turn around a common axis 26. As noted above, the wheels 14 support the frame 12 upon a subjacent surface 28 and roll against that surface 28 to allow the apparatus 10 to be advanced over and against the surface 28.

The frame 12 has a front 30 and rear 32 and laterally spaced sides 34, 36.

At the rear 32 of the frame 12, a handle assembly at 38 is provided. The handle assembly 38 has a forwardly opening, reinforced, "U" shape with a gripping region at 40 defined at the base of the "U". The gripping region 40 is configured to be engaged by the hands of a user situated behind the apparatus 10. Forces can be applied to the gripping region 40 to move the apparatus 10 relative to the subjacent surface 28 in operation.

In this embodiment, the drive 16 is shown as a fuel powered engine that is mounted on a main section 42 of the frame 12 so that the weight thereof is concentrated over the wheel axis 26.

The frame 12 further includes an arm 44 projecting in cantilever fashion forwardly from the main section 42 and supporting a first shaft 46 for guided movement relative to the frame 12 about the vertically extending axis 48. The fan assembly 20 turns with the first shaft 46 around the axis 48 with the blower assembly 18 operatively positioned, as shown in FIGS. 3-5.

Figure 7:
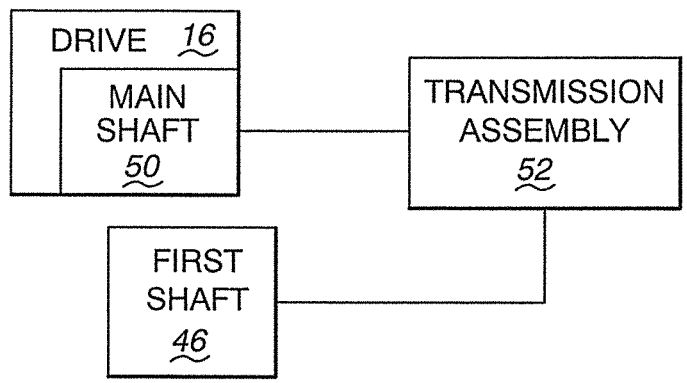
FIG. 7 is a schematic representation of a transmission assembly that acts between a drive on the frame, as shown in FIG. 1, and a shaft that is driven to operate the blower assembly in FIGS. 2-6.

While the invention contemplates that the drive 16 might directly turn the first shaft 46, in the depicted embodiment, the drive 16 indirectly turns the first shaft through an arrangement of components as shown schematically in FIG. 7. More specifically, the drive 16 has its own main shaft 50 that turns around an axis. Through a transmission assembly 52, the main shaft 50 drives the shaft 46 around its axis 48. In this embodiment, the axes for the shafts 46, 50 are spaced in a fore-and-aft direction. The transmission assembly 52 may be in the form of a belt, gears, etc. or any combination thereof.

As seen in FIGS. 2-6, the blower assembly 18 is made up of a housing 54, in this embodiment made up of joinable main and cover parts 56, 58, respectively. The housing 54 could be constructed differently, as with a single permanently formed part.

The housing parts 56, 58 cooperatively bound a chamber 60 within which the fan assembly 20 resides as it turns around the vertically extending axis 48.

In this embodiment, the fan assembly 20 consists of a hub 62, a solid bottom plate 64, and an annular top plate 66. A plurality of air pushing vanes 68 are mounted to each of the hub 62, bottom plate 64, and top plate 66. Each vane 68 is substantially flat, with the plane thereof projecting in a line that does not intersect the axis 48 with the blower assembly 18 operatively positioned.

With the fan assembly 20 within the chamber 60 and turned around the axis 48, the vanes 68 create a low pressure region that causes atmospheric air to be drawn axially downwardly through openings 70 in a top wall 72 on the main housing part 56 and into the chamber 60. This air is centrifugally propelled by the vanes 68 against a radially inwardly facing surface 73 on a substantially annular wall portion 74 on the main housing part 56 and expelled under pressure through a discharge conduit 76. The pressurized air generated by the fan assembly 20 is directed in a substantially straight stream in a discharge direction, as indicted by the arrow 78 in FIGS. 2 and 6.

The cover part 58 of the housing is assembled to the main part 56 of the housing 54 through a cooperating arrangement of tabs 80 and slots 82, respectively on the cover part 58 and main part 56. Of course, this arrangement could be reversed. In this embodiment, six tabs 80 are shown on the cover part 58, although this is primarily a design consideration. At least a like number of slots 82 are formed through an annular rim 84 on the bottom of the main part 56. As the cover part 58 is raised, the tabs 80 are moved through the slots 82 so that they reside above the rim 84. By then turning the cover part 58 around the axis 48 relative to the main part 56, the tabs 80 reside over solid portions of the rim 84 so that the cover part 58 is blocked from moving downwardly relative to the main part 56. The fan assembly 20 thus becomes captive between the cover part 58 and the top wall 72 of the main part 56. Other interconnecting components are contemplated for joining the housing parts 56, 58, including a permanent connection therebetween.

The mounting unit 86 has a hub 88 that is internally threaded to engage external threads 90 on the first shaft 46. With the first shaft 46 directed through the housing parts 56, 58 and the hub 62 on the fan assembly 20 within the housing chamber 60, the end of the first shaft 46 is exposed to threadably engage the mounting unit 86. By then turning the mounting unit 86, the fan assembly 20 can be drawn upwardly against a portion of the first shaft 46 to cause the fan assembly 20 to follow movement of the first shaft 56 as it moves around the axis 48.

The mounting unit 86 has a smooth, convex bottom surface 92 that is below the housing 54 to abut the subjacent surface 28 to limit downward movement of the blower assembly 18, effected as through pivoting of the frame 12 around the wheel axis 26, without binding thereagainst. The configuration of the bottom surface 92 is common to many different line trimmers that are designed to bear against a subjacent surface during operation without generating any significant turning resistance force.

Figure 8:
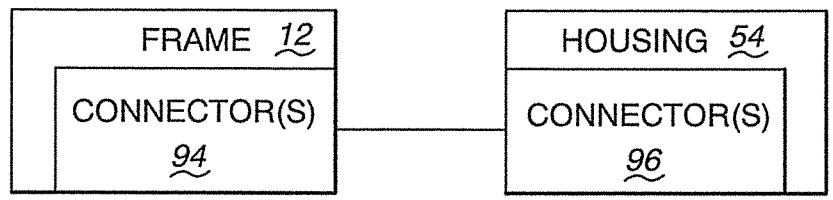
FIG. 8 is a schematic representation of a connection between the blower housing and frame.

The housing 54 could be fixed to the frame 12 so that the discharge direction established by the discharge conduit 76 is fixed. More preferably, and as shown herein, the housing 54 is configured so that the discharge direction relative to the frame 12 can be selectively changed. In FIG. 8, there is a schematic depiction of connectors 94, 96, respectively on the frame 12 and housing 54, contemplated that allow the housing 54 to be placed in different angular relationships with the frame 12 to change the discharge direction for the generated pressurized air.

Figure 2:
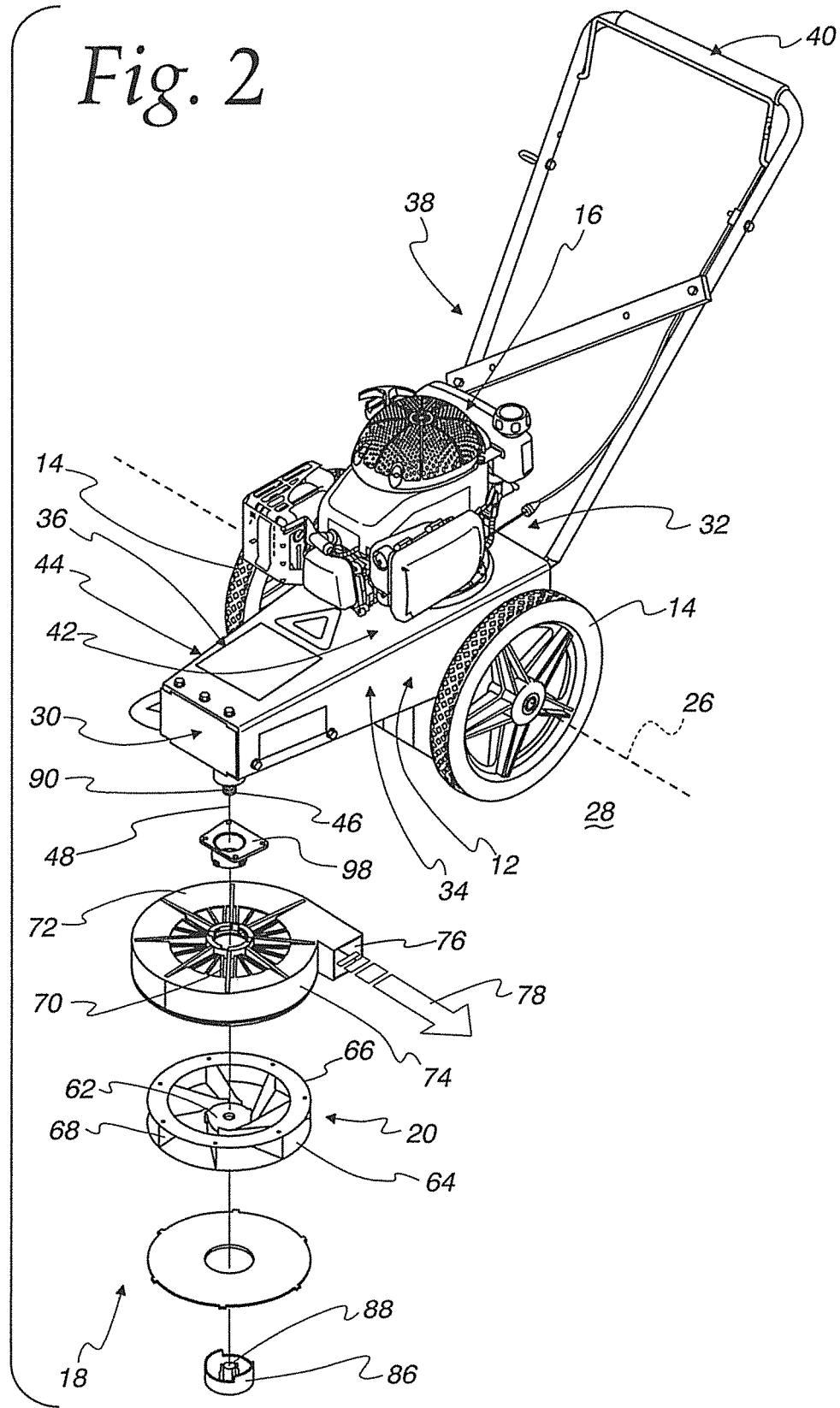
FIG. 2 is an exploded, perspective view of one specific form of the apparatus in FIG. 1 utilizing the blower assembly.

One specific form of the connectors 94, 96, within the broader structural concept contemplated by the schematic depiction in FIG. 8, is shown in FIGS. 2 and 6. In the embodiment depicted, an adaptor 98 is provided as original equipment or as a retrofit part to convert a conventional frame configuration, adapted for another function, to accommodate the blower assembly 18. The adaptor 98 has a cylindrical, depending boss 100 that is fixed to the frame through a mounting plate 102 using conventional fasteners. The boss 100 is substantially concentric with the vertically extending axis 48. Circumferentially spaced tabs 104, 106 are provided on the boss 100 and project radially outwardly therefrom.

The tabs 104, 106 function as the aforementioned connectors 94 on the frame 12 and cooperate with connectors 108 on the housing 54, corresponding to the connectors 94, to allow the housing 54 to be placed selectively in different predetermined angular positions relative to the axis 48, wherein the discharge conduit 76 is oriented to direct a stream of pressurized air in different directions. The connectors 108 on the housing 54 are configured to simultaneously accommodate both of the tabs/connectors 104, 106 with the housing 54 in different angular orientations. The tabs 104, 106 cooperate with different combinations of vertically extending slots 110a, 110b, 110c, 110d on the connectors 108, with the housing 54 in different angular orientations. The slots 110a-d are spaced from each other an angular distance equal to the angular distance between the tabs 104, 106.

Exemplary vertical slot 110*a* is contiguous with a bounded arcuate slot 112*a* which terminates at a location remote from the vertical slot 110*a* at an upwardly projecting locking slot 114*a* that is bounded by an annular wall 116 through which the vertical slots 110*a-d* are formed.

Each of the vertical slots 110*b-d* has an associated arcuate slot and locking slot, which are not numbered in the drawings.

The angular position of the housing 54, and thus the discharge direction for the pressurized air stream, is determined by which pair of the vertical slots 110*a-d* the tabs 104, 106 are simultaneously directed into. The housing 54 may be initially supported by bearing downwardly upon the fan assembly 20 such that the tabs 104, 106 reside above the entryways to the slots 110*a-d*. By then drawing the housing 54 upwardly, the tabs 104, 106 can be directed into and through a pair of the vertical slots 110*a-d*. As this occurs, a tab 104, 106, moving in exemplary vertical slot 110*a*, will move into vertical alignment with the arcuate slot 112*a*, whereupon turning places that tab in angular alignment with the locking slot 114*a*. By then releasing the housing 54, the housing will, under its own weight, move downwardly to draw the tab 104,106 into the locking slot 114*a*, whereupon the housing 54 is blocked against angular movement relative to the frame 12 around the axis 48. The tabs 104, 106 cooperate in like fashion to stably support the housing in the desired angular orientation.

By directing the tab 106 into the vertical slot 110*c* and the tab 104 into the vertical slot 110*b*, and effecting the aforementioned sequence of movements, the discharge conduit 76 will be aligned so that the discharge direction is forwardly with respect to the frame 12, as seen in FIG. 4. With the tab 106 initially aligned with the slot 110*d*, the discharge direction will be to one side, as seen in FIG. 3, whereas with the tab 106 initially aligned with the slot 110*b*, the discharge direction will be laterally oppositely, as seen in FIG. 5.

Accordingly, the cooperating connectors/tabs 104, 106 and 108 are configured to allow the housing 54 to be selectively moved from a separated state into an assembled state by relatively moving the housing 54 and frame 12 in a predetermined manner through a sequence of steps, i.e., vertical movement and turning, as an incident of which the housing 54 is releasably maintained in an assembled state without requiring separate fasteners. Accordingly, with the housing 54 in any of the orientations shown in FIGS. 3-5, the user may effect reorientation thereof by simply lifting the housing 54 slightly to allow movement of the tabs 104, 106 in a pair of the arcuate slots 112 so that they align with the vertical slots 110*a-d*, whereupon the housing 54 can be lowered and turned angularly once the tabs 104, 106 reside vertically above the slots 110*a-d*. The tabs 104, 106 can be aligned over the desired pair of slots 110*a-d* to repeat the process described above.

Figure 9:
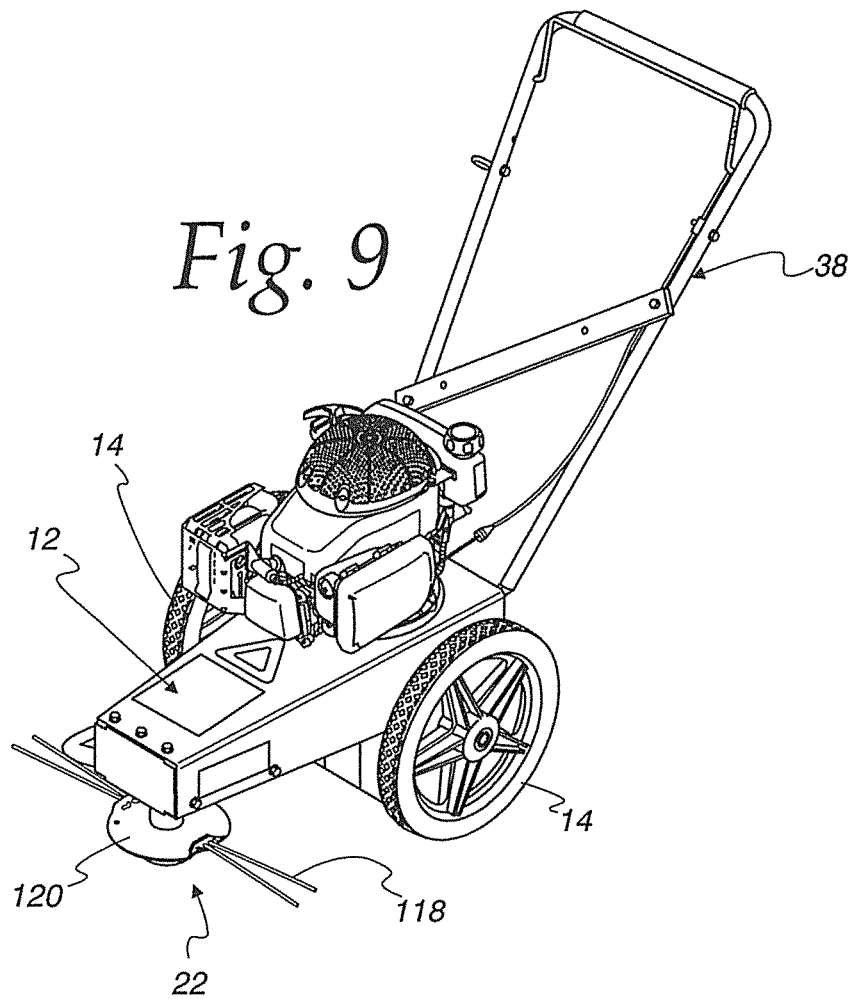
FIG. 9 is a view as in FIGS. 3-5 with the vegetation trimming assembly in FIG. 1 operatively positioned on the frame in place of the blower assembly.
Figure 10:
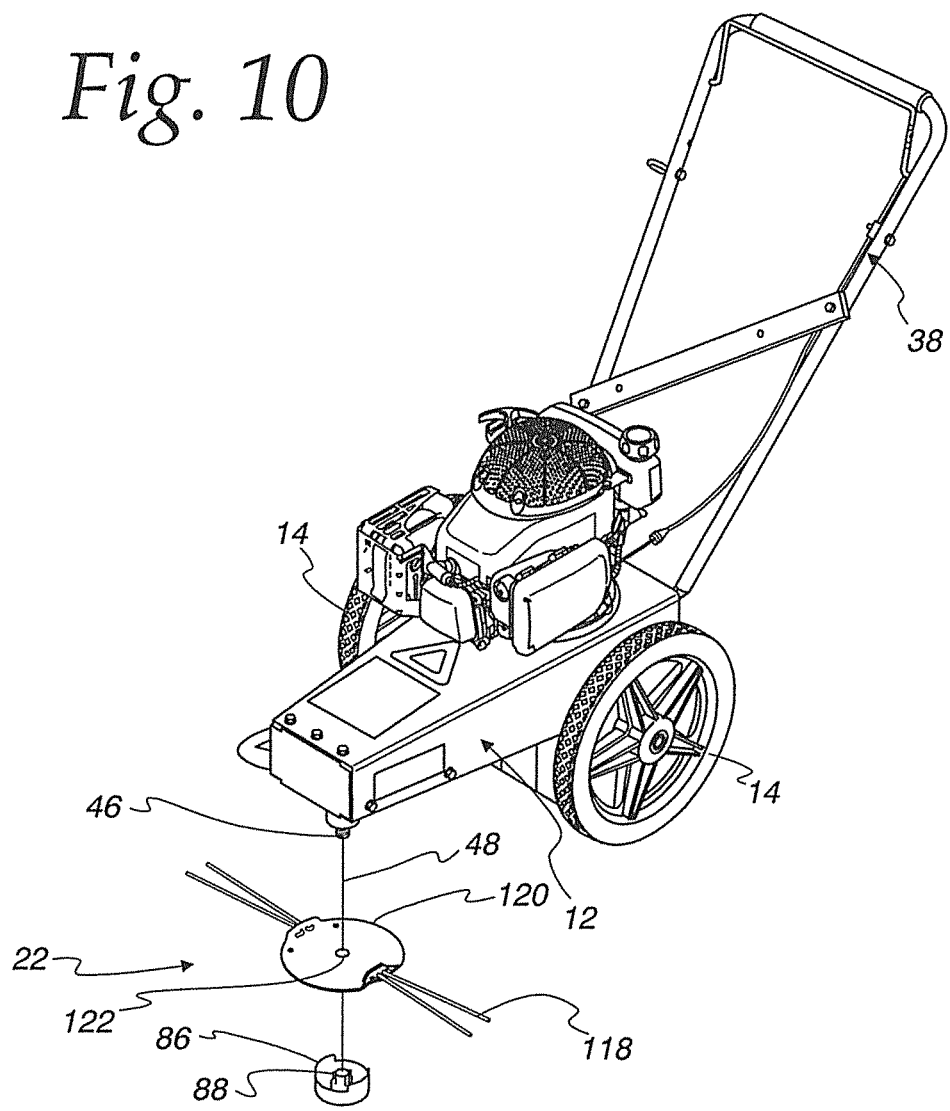
FIG. 10 is an exploded perspective view of the apparatus in FIG. 9.

With the blower assembly 18 fully separated from the remainder of the unit, the vegetation trimming assembly 22, as shown in exemplary form in FIGS. 9 and 10, can be operatively positioned on the frame 12.

The vegetation trimming assembly 22, within the schematic showing in FIG. 1, encompasses virtually any type of cutting configuration that has the ability to sever vegetation upon being turned around the vertically extending axis 48. The cutting element 24 could be in a blade form, but is more preferably in the form of an elongate body 118 projecting radially away from the axis 48. The elongate body 118 could be a flexible line or have a more rigid construction. In this embodiment, a plurality of elongate bodies 118 are provided in pairs projecting radially oppositely from a main body 120 to which the individual bodies 118 are assembled.

The main body 120, in the depicted form, has a generally flat construction with an opening 122 through which the first shaft 46 can extend. With the first shaft 46 extended downwardly through the opening 122, the externally threaded portion 90 thereof is exposed to be engaged by the internally threaded hub 88 on the aforementioned mounting unit 86. Through the mounting unit, the main body 120 is releasably secured to the first shaft 46 so that the main body 120 follows movement of the first shaft 46 around the vertically extending axis 48 with the vegetation trimming apparatus operatively positioned, as shown in FIG. 9.

With the above-described structure, a user has the option of operatively positioning either the blower assembly 18 or the vegetation trimming assembly 22 on the frame 12. Changing back and forth between the blower assembly 18 and vegetation trimming assembly 22 is readily accomplished. By separating the mounting unit 86, the operatively positioned blower assembly 18 or vegetation trimming assembly 22 can be separated. The other of the blower assembly 18 and vegetation trimming assembly 22 can be readily substituted.

In the case of the blower assembly 18, the first shaft 46 is directed by translation through the housing 54 and fan assembly 20, and in the case of the vegetation trimming assembly 22, the first shaft 46 is directed by translation through the main body 120 to expose the externally threaded portion of the first shaft 46 to accept the mounting unit 86. The same mounting unit 86 can then be threaded into place to secure in place the operatively positioned blower assembly 18 or vegetation trimming assembly 22.

Reorientation of the housing between the FIG. 3, FIG. 4, and FIG. 5 orientations can be effected by simply vertically repositioning and turning the housing 54 in the above-described sequence of steps. The mounting unit 86 need not be loosened to allow this reorientation. Thus, a user potentially can readily change the orientation of the housing in a matter of seconds on a site at which the apparatus 10 is being used.

The foregoing disclosure of specific embodiments is intended to be illustrative of the broad concepts comprehended by the invention.

The invention claimed is:

1. A powered landscaping apparatus comprising:
   a frame;
   at least one wheel on the frame through which the frame can be supported upon and advanced over a subjacent support surface;
   a blower assembly operatively positioned on the frame and comprising a fan assembly that is mounted to be turned guidingly around a vertically extending axis; and
   a drive on the frame for moving the fan assembly around the vertically extending axis,
   the blower assembly configured to generate a pressurized supply of air that is propelled in a stream that is directed in a manner to continuously redistribute loose material that resides on the subjacent support surface as the fan assembly is moved around the vertically extending axis by the drive and the frame is advanced over the subjacent support surface,
   wherein the powered landscaping apparatus has a front and rear and laterally spaced sides, the frame further comprises a handle assembly with at least one gripping region that is configured to be engaged by a user situated behind the powered landscaping apparatus and at which forces can be applied by a user to move the powered landscaping apparatus relative to the subjacent support surface, wherein the powered landscaping apparatus further comprises a vegetation trimming assembly configured to be operatively positioned on the frame in place of the blower assembly, the vegetation trimming assembly comprising at least one cutting element that is turned around the vertically extending axis as the drive is operated with the vegetation trimming assembly operatively positioned, wherein the vegetation trimming apparatus comprises a main body that carries the at least one cutting element, the powered landscaping apparatus further comprising a mounting unit that is configured to releasably secure the main body to a first shaft so that the main body follows movement of the first shaft around the vertically extending axis with the vegetation trimming apparatus operatively positioned, wherein the mounting unit is configured to releasably secure the fan assembly to the first shaft so that the fan assembly follows movement of the first shaft around the vertically extending axis with the blower assembly operatively positioned, wherein the blower assembly comprises a housing that is attached to the frame and defines a chamber within which the fan assembly moves, wherein the mounting unit comprises a downwardly facing surface that is configured to bear against the subjacent support surface to confine downward movement of the blower assembly with the blower assembly operatively positioned on the frame.

2. The powered landscaping apparatus according to claim 1 wherein the frame comprises a main section on which the drive is mounted, the at least one wheel comprising first and second spaced wheels, and the frame further comprises an arm projecting forwardly from the main section and supporting the first shaft that is turned around the vertically extending axis by the drive.

3. The powered landscaping apparatus according to claim 2 wherein the drive has an associated main shaft that is spaced from, and drives, the first shaft around the vertically extending axis as the drive is operated.

4. The powered landscaping apparatus according to claim 1 wherein the at least one cutting element comprises an elongate body projecting radially away from the vertically extending axis.

5. The powered landscaping apparatus according to claim 4 wherein the elongate body comprises a flexible line.

6. The powered landscaping apparatus according to claim 1 wherein the blower assembly housing has a top and bottom and the mounting unit extends downwardly past the bottom of the blower assembly to define an exposed portion that can be engaged to facilitate repositioning of the mounting unit with the blower assembly operatively positioned on the frame.

7. The powered landscaping apparatus according to claim 6 wherein the mounting unit comprises a downwardly facing surface on the exposed portion that is convexly shaped.

8. The powered landscaping apparatus according to claim 1 wherein the blower assembly housing is attached to the frame and maintained on the frame through cooperating connectors on the frame and housing spaced from the mounting unit and defines a chamber within which the fan assembly moves, the cooperating connectors remaining at all times fixed to the frame and housing.

9. The powered landscaping apparatus according to claim 8 wherein the housing defines a discharge conduit through which pressurized air generated by the fan assembly is directed in a stream in a discharge direction.

10. The powered landscaping apparatus according to claim 9 wherein the housing is configured so that the discharge direction relative to the frame can be selectively changed.

11. The powered landscaping apparatus according to claim 8 wherein the housing comprises two separate parts between which the fan assembly is captively located.

12. The powered landscaping apparatus according to claim 9 wherein the cooperating connectors are configured to allow the housing to be selectively placed and releasably maintained in first and second different predetermined positions wherein the discharge conduit is oriented to direct the stream of pressurized air in first and second different directions.

13. The powered landscaping apparatus according to claim 1 wherein the housing and frame have cooperating connectors configured to allow the housing to be selectively moved from a separated state into an assembled state by relatively moving the housing and frame in a predetermined manner as an incident of which the housing is maintained in the assembled state without requiring separate fasteners, one of the cooperating connectors on the housing at all times fixed to the housing at all times fixed to the housing, one of the cooperating connectors on the frame at all times fixed to the frame.

14. The powered landscaping apparatus according to claim 1 wherein the fan assembly comprises a plurality of air pushing vanes that project in lines that do not intersect at the vertically extending axis.

15. A powered landscaping apparatus comprising:
a frame;
at least one wheel on the frame through which the frame can be supported upon and advanced over a subjacent support surface;
a blower assembly operatively positioned on the frame and comprising a fan assembly that is mounted to be turned guidingly around a vertically extending axis; and
a drive on the frame for moving the fan assembly around the vertically extending axis,
the blower assembly configured to generate a pressurized supply of air that is propelled in a stream that is directed in a manner to continuously redistribute loose material that resides on the subjacent support surface as the fan assembly is moved around the vertically extending axis by the drive and the frame is advanced over the subjacent support surface,
wherein the powered landscaping apparatus has a front and rear and laterally spaced sides, the frame further comprises a handle assembly with at least one gripping region that is configured to be engaged by a user situated behind the powered landscaping apparatus and at which forces can be applied by a user to move the powered landscaping apparatus relative to the subjacent support surface,
wherein the powered landscaping apparatus further comprises a vegetation trimming assembly configured to be operatively positioned on the frame in place of the blower assembly, the vegetation trimming assembly comprising at least one cutting element that is turned around the vertically extending axis as the drive is operated with the vegetation trimming assembly operatively positioned, wherein the vegetation trimming apparatus comprises a main body that carries the at least one cutting element, the powered landscaping apparatus further comprising a mounting unit that is configured to releasably secure the main body to a first shaft so that the main body follows movement of the first shaft around the vertically extending axis with the vegetation trimming apparatus operatively positioned, wherein the mounting unit is configured to releasably secure the fan assembly to the first shaft so that the fan assembly follows movement of the first shaft around the vertically extending axis with the blower assembly operatively positioned, wherein the blower assembly comprises a housing that is attached to the frame and defines a chamber within which the fan assembly moves, wherein the mounting unit is exposed with the blower assembly operatively positioned on the frame to allow the mounting unit to be repositioned to allow the blower assembly housing to be separated from the frame, wherein the first shaft extends downwardly through: a) the main body when the vegetation trimming assembly is operatively positioned on the frame; and b) the housing when the blower assembly is operatively positioned on the frame, and the mounting unit is releasably connected to the first shaft to releasably maintain the vegetation trimming assembly operatively positioned on the frame and the fan assembly and housing secured to the first shaft, wherein the blower assembly comprises a housing that is attached to the frame and defines a chamber within which the fan assembly moves and the downwardly facing surface of the mounting unit resides below the housing with the blower assembly operatively positioned.

16. A powered landscaping apparatus comprising:

a frame;

at least one wheel on the frame through which the frame can be supported upon and advanced over a subjacent support surface;

a blower assembly operatively positioned on the frame and comprising a fan assembly that is mounted to be turned guidingly around a vertically extending axis; and a drive on the frame for moving the fan assembly around the vertically extending axis, the blower assembly configured to generate a pressurized supply of air that is propelled in a stream that is directed in a manner to continuously redistribute loose material that resides on the subjacent support surface as the fan assembly is moved around the vertically extending axis by the drive and the frame is advanced over the subjacent support surface, wherein the powered landscaping apparatus has a front and rear and laterally spaced sides, the frame further comprises a handle assembly with at least one gripping region that is configured to be engaged by a user situated behind the powered landscaping apparatus and at which forces can be applied by a user to move the powered landscaping apparatus relative to the subjacent support surface, wherein the powered landscaping apparatus further comprises a vegetation trimming assembly configured to be operatively positioned on the frame in place of the blower assembly, the vegetation trimming assembly comprising at least one cutting element that is turned around the vertically extending axis as the drive is operated with the vegetation trimming assembly operatively positioned, wherein the vegetation trimming apparatus comprises a main body that carries the at least one cutting element, the powered landscaping apparatus further comprising a mounting unit that is configured to releasably secure the main body to a first shaft so that the main body follows movement of the first shaft around the vertically extending axis with the vegetation trimming apparatus operatively positioned, wherein the mounting unit is configured to releasably secure the fan assembly to the first shaft so that the fan assembly follows movement of the first shaft around the vertically extending axis with the blower assembly operatively positioned, wherein the blower assembly comprises a housing that is attached to the frame and defines a chamber within which the fan assembly moves, wherein the mounting unit is exposed with the blower assembly operatively positioned on the frame to allow the mounting unit to be repositioned to allow the blower assembly housing to be separated from the frame, wherein the first shaft extends downwardly through: a) the main body when the vegetation trimming assembly is operatively positioned on the frame; and b) the housing when the blower assembly is operatively positioned on the frame, and the mounting unit is releasably connected to the first shaft to releasably maintain the vegetation trimming assembly operatively positioned on the frame and the frame assembly secured to the first shaft, wherein the mounting unit has a convexly curved surface to engage the subjacent surface with each of the trimmer assembly and blower assembly operatively positioned on the frame.

17. A powered landscaping apparatus comprising:

a frame with a front, a rear, and laterally spaced sides;

at least one wheel on the frame through which the frame can be supported upon and advanced over a subjacent support surface;

a blower assembly operatively positioned on the frame and comprising a fan assembly that is mounted to be turned guidingly around a vertically extending axis; and a drive on the frame for moving the fan assembly around the vertically extending axis, the blower assembly configured to generate a pressurized supply of air that is propelled in a stream that is directed in a manner to continuously redistribute loose material that resides on the subjacent support surface as the fan assembly is moved around the vertically extending axis by the drive and the frame is advanced over the subjacent support surface, wherein the blower assembly comprises a housing attached to the frame and defining a chamber within which the fan assembly moves, wherein the housing defines a discharge conduit through which pressurized air generated by the fan assembly is directed in a stream in a discharge direction, wherein the housing and frame have cooperating connectors at all times fixed to the housing and frame and configured to allow the housing to be turned around the vertically extending axis relative to the frame and the drive to thereby be selectively placed in first and second different predetermined positions wherein the discharge conduit is oriented to direct the stream of pressurized air in first and second different discharge directions, wherein the first and second different discharge directions are two of forward and opposite side directions.

18. The powered landscaping apparatus according to claim 17 wherein the frame further comprises a handle assembly with at least one gripping region that is configured to be engaged by a user situated behind the powered landscaping apparatus and at which forces can be applied by a user to move the powered landscaping apparatus relative to the subjacent support surface.

19. The powered landscaping apparatus according to claim 18 wherein the powered landscaping apparatus further comprises a vegetation trimming assembly configured to be operatively positioned on the frame in place of the blower assembly, the vegetation trimming assembly comprising at least one cutting element that is turned around the vertically extending axis as the drive is operated with the vegetation trimming assembly operatively positioned.

20. The powered landscaping apparatus according to claim 19 wherein the at least one cutting element comprises a plurality of elongate bodies each projecting radially away from the vertically extending axis.

21. The powered landscaping apparatus according to claim 17 wherein the cooperating connectors comprise at least one tab on one of the housing and frame and one slot on the other of the housing and frame, the frame, housing, one tab and one slot configured so that with the housing and frame in a first angular relationship the housing can be directed in one axial direction relative to the frame to cause the one tab to move through the one slot whereupon the housing can be moved to place the housing and frame in a second angular relationship whereupon the one tab blocks movement of the housing relative to the frame oppositely to the one axial direction.

* * * * *